United States Patent [19]

Luetzelschwab

[11] Patent Number: 4,482,704
[45] Date of Patent: Nov. 13, 1984

[54] METHOD AND APPARATUS FOR MULTIPLE RECYCLE POLYMER DILUTION

[75] Inventor: Wayne E. Luetzelschwab, Littleton, Colo.

[73] Assignee: Marathon Oil Company, Findlay, Ohio

[21] Appl. No.: 443,286

[22] Filed: Nov. 22, 1982

[51] Int. Cl.³ .......................... C08F 6/00; B01F 15/02
[52] U.S. Cl. .................................... 528/480; 528/499; 528/502; 523/343; 523/351; 366/136; 366/137; 137/1
[58] Field of Search ............... 528/480, 499, 502; 523/343, 334, 351; 366/136, 137; 137/1

[56] References Cited

U.S. PATENT DOCUMENTS

| | | | |
|---|---|---|---|
| 3,032,545 | 5/1962 | Renberg | 528/480 X |
| 3,243,400 | 3/1966 | Lipton et al. | 523/343 DR |
| 4,069,161 | 1/1978 | Poger | 528/502 X |

Primary Examiner—John Kight
Assistant Examiner—Garnette D. Draper
Attorney, Agent, or Firm—Jack L. Hummel

[57] ABSTRACT

A method and apparatus for the continuous processing of polymers and, more particularly, a method and apparatus for the continuous dilution of solutions of long-chain polymers by successive or multiple recycling without degrading of the polymers.

33 Claims, 1 Drawing Figure

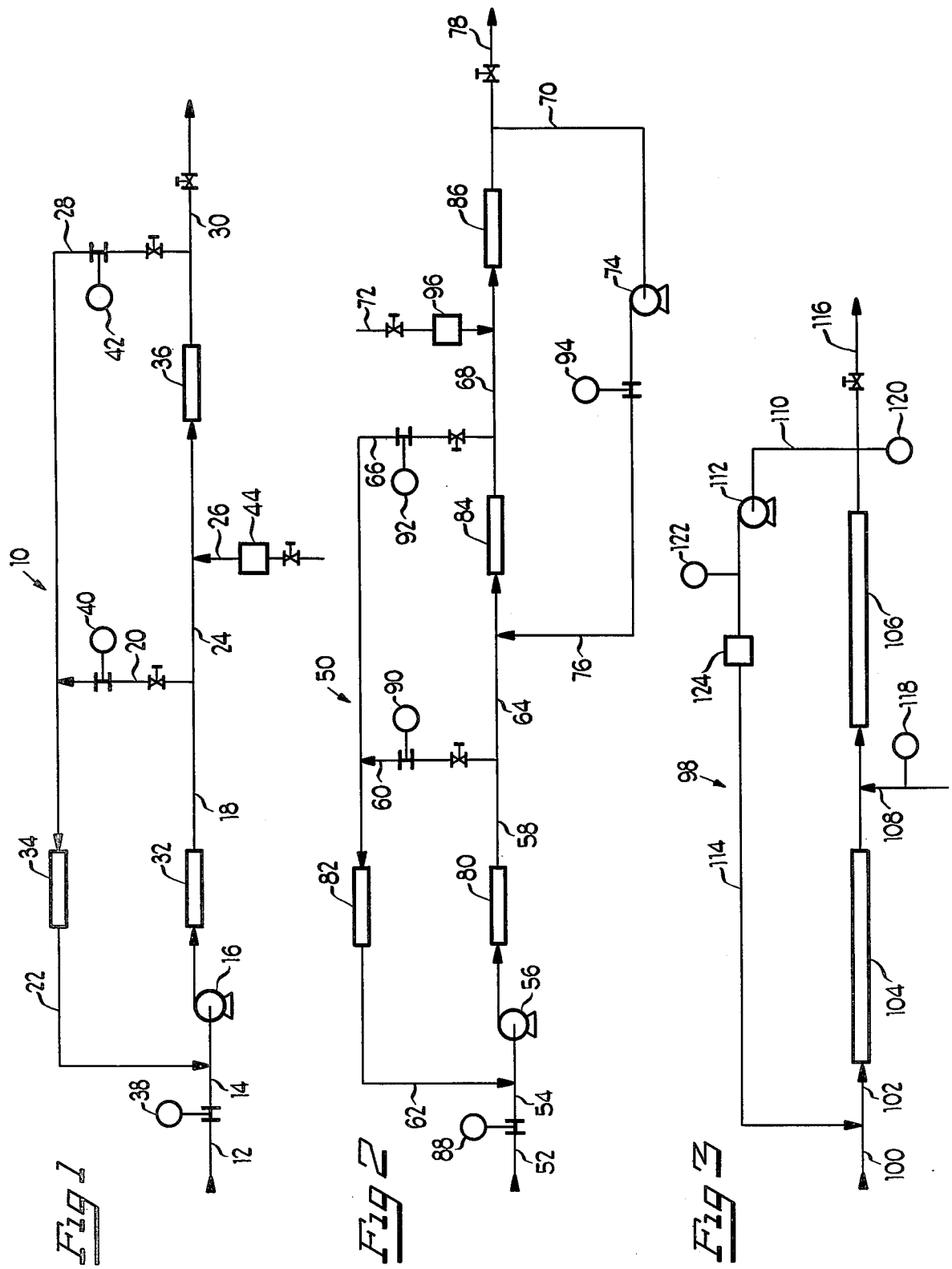

METHOD AND APPARATUS FOR MULTIPLE RECYCLE POLYMER DILUTION

TECHNICAL FIELD

The present invention relates to a method and apparatus for the continuous processing of polymers and, more particularly, to a method and apparatus for the continuous dilution of solutions of long-chain polymers by successive or multiple recycling without degrading of the polymers.

BACKGROUND OF THE PRIOR ART

Polymers are substances composed of very large molecules formed by linking together structural units, called monomers, in long chains. Because of their "linked" nature, polymers present significant material handling and processing problems. Mechanically- and thermally- induced stresses may act to break, or "degrade," the polymer chains, thus adversely affecting the properties of the polymer. Such problems may occur during physical contact of polymer solutions with conduit walls, valve seats and stems, and the like, during pumping through conduits, or may occur when batches of polymer are stored or shipped, and undergo physical shocks or extreme changes in ambient temperature. It has also been found that dilution of polymer solutions may, in itself, induce degradation where the difference in viscosity between the diluent and the polymer solution is appreciable at the point of diluent addition. One group of polymers susceptible to degradation during dilution is the polyacrylamides, especially partially hydrolyzed polyacrylamides. The problem is particularly troublesome where the partially hydrolyzed polyacrylamides are employed as drive fluids or mobility control agents in the secondary or tertiary recovery of oil from oil-bearing subterranean formations. Degradation of polyacrylamides of this type during dilution results in a loss of the injectivity and mobility control properties of the polymer thereby greatly diminishing the ability of the polymer to meet the performance demands of the oil-bearing formation.

Various attempts have been made to overcome the problems encountered in the handling and processing of polymer solutions. In U.S. Pat. No. 3,034,526, for example, a three-dimensional cascade system is disclosed for use in limiting degradation of such linear polymers as nylon and Saran. U.S. Pat. No. 3,468,322 discloses the use of lengths of chain in a polymer flow system to minimize shear forces created when water-soluble polymers are diluted.

Control of disruptive shear forces is the subject of U.S. Pat. No. 3,945,402 wherein specially shaped, smooth-wall conduits are used to enable flow at high Reynolds numbers.

Controlling residence time of polymers flowing through pipelines is the subject of U.S. Pat. Nos. 3,128,794 and 3,353,564. U.S. Pat. No. 3,128,794 teaches the use of diverters to direct the flow of polymer from the walls of the conduit to the center, and vice versa. U.S. Pat. No. 3,353,564 shows the utilization of screens placed in the polymer flow path to equalize residence time within the conduit and minimize thermal degradation of the polymer.

BRIEF DESCRIPTION OF THE INVENTION

Aqueous solutions of polyacrylamides, especially partially hydrolyzed acrylamides, have been widely used as drive fluids and/or mobility buffers in the secondary or tertiary recovery of oil from subterranean formations or reservoirs. The aqueous solutions are prepared by polymerizing an acrylamide monomer and then reacting the polymer with a monovalent base such as dilute sodium hydroxide to hydrolyze a predetermined mole percent of the amide groups comprising the polymer. The concentration of the partially hydrolyzed polymer in the aqueous solutions is of the order of 6%, and the solution has a gel-like consistency. The 6% solution desirably is first diluted with water to form approximately a 1%, by weight, solution of the polymer, and then, prior to injection into an input well, is further diluted with water to provide an aqueous solution comprising anywhere from 50 to 5000 parts, more or less, per million of the polymer.

In accordance with the present invention, a method and apparatus have been evolved for diluting polymer solutions such as aqueous solutions of partially hydrolyzed polyacrylamides whereby degradation of the polymer comprising the solution is essentially eliminated. As a result, the injectivity and mobility properties of the polymer solution remain substantially constant, and at their maximum effectiveness, thereby imparting a high degree of predictability to the performance capabilities of the solution. This enables smaller volumes of the polymer solutions to be used, and contributes significantly to the efficiency of the oil recovery operation, factors which materially lower the normally high costs of such operations.

In brief, the apparatus of this invention comprises a series of recycle lines or conduits carrying polymer streams of lesser concentration to be combined with polymer streams of higher concentration at points upstream of the polymer streams of lesser concentration. The lines or conduits are arranged in a manner to enable diluent to be introduced into polymer streams having a concentration of polymer which is significantly less than that of the starting or initial solution to be diluted. By thus introducing diluent into a polymer stream of relatively low viscosity and then progressively blending the diluted stream with polymer solution streams of similar viscosities, predetermined dilution of the starting or initial concentrated polymer solution is achieved while at the same time eliminating the shear induced degradation of the polymer which results from the intermixing or blending of solutions of widely differing viscosities.

In accordance with one embodiment of the apparatus of the present invention, a supply conduit for carrying a concentrated polymer solution is branched at a first juncture to form a first recycle loop which rejoins the supply conduit at a second juncture upstream of the first juncture. A second recycle loop branches from the polymer solution supply conduit downstream of the first juncture at a third juncture, and joins the first recycle loop at a fourth juncture in communication with said first juncture, and downstream of said second juncture. Diluent desirably is introduced into the system comprising the first and second recycle loops at a point in the polymer solution supply conduit located downstream with relation to the first juncture and upstream with relation to the third juncture.

In accordance with another embodiment of the apparatus, a third recycle loop branches from the polymer supply conduit of the first and second recycle loops at a fifth juncture downstream of said third juncture comprising the second recycle loop. The third recycle loop rejoins the polymer solution supply conduit of the second recycle loop at a sixth juncture located downstream from the first juncture and upstream with relation to the third juncture of the second recycle loop. Diluent desirably is introduced into the system comprising the third recycle loop by means of a conduit or line which joins the polymer solution supply conduit at a point downstream from the third juncture comprising the second recycle loop and upstream of the fifth juncture of the third recycle loop. Mixing or blending means advantageously is positioned in each of the recycling loops to attain proper intermixing of the polymer solutions of differing concentrations and viscosities. Flow control throughout the systems is regulated by pumps desirably of the variable speed type.

In accordance with one of the method aspects of the invention, utilizing a double recycle system, a starting polymer solution having an initial, higher concentration of polymer is intermixed or blended with a recycled polymer solution having a polymer concentration lower than that of the starting polymer solution to provide a first diluted polymer solution. One portion of said first diluted polymer solution is intermixed or blended with a diluent to provide a second diluted polymer solution having the desired concentration of polymer. Another portion of the said first diluted polymer solution is intermixed or blended with a portion of the second diluted polymer solution to provide a third diluted polymer solution, the latter solution comprising the recycled polymer solution which is intermixed or blended with the starting solution. The remaining portion of the second diluted polymer solution, which, as indicated, contains the desired concentration of polymer, is conveyed to storage, or is subjected to further dilution prior to injection into an input well, for example. In carrying out the method of this invention in a three recycle loop system, a portion of said second diluted polymer solution is recycled and intermixed or blended with a portion of the first diluted polymer solution to provide a fourth diluted polymer, a portion of which is intermixed or blended with a portion of the first diluted polymer solution, and another portion of which is intermixed or blended with a diluent to provide the second diluted polymer solution having the desired final concentration of the polymer.

The apparatus and the method of the present invention are readily adaptable for use in the field, especially for the on-site, continuous preparation of aqueous solutions of polymers such as partially hydrolyzed polyacrylamides for use in secondary and tertiary oil recovery operations. The equipment required can be easily transported and set up, and only minimum personnel are needed to operate and maintain the equipment.

The foregoing, and other features and advantages of this invention will become more apparent from the description to follow, taken in conjunction with the accompanying drawings.

BRIEF DESCRIPTION OF THE DRAWINGS

FIG. 1 is a diagrammatic view of one embodiment of the apparatus of the present invention utilizing a double recycle system to achieve dilution of a polymer solution;

FIG. 2 is a diagrammatic view of another embodiment of the apparatus showing a multiple recycle system to effect dilution of a polymer solution; and FIG. 3 is a diagrammatic view of yet another embodiment of the recycle apparatus.

DETAILED DESCRIPTION OF THE INVENTION

The embodiment of the apparatus illustrated in FIG. 1, and designated generally by reference numeral 10, comprises a double recycle loop system. The system includes an inlet 12 through which a starting polymer solution having an initial, higher concentration of polymer enters a polymer supply conduit 14. The conduit 14 is connected to the inlet of a pump 16 which controls flow in the system. While various types of pumps can be empolyed, it is preferred to use a variable speed pump. Such pumps are available commercially under the designation "MOYNO". The outlet of the pump 16 is connected to a conduit 18 which intersects a first polymer solution diversion conduit 20. The conduit 20, in turn, joins a recycle conduit 22 which is connected to the polymer supply conduit 14 upstream of the pump 16. The conduits 14, 18, 20 and 22 constitute the first recycle loop of the apparatus 10.

At the intersection or juncture of the conduits 18 and 20, the conduit 18 is connected to a conduit 24 which is in communication with a diluent supply conduit 26. Downstream of its connection to the conduit 26, the conduit 24 is joined to a second polymer solution diversion conduit 28. The conduit 28, in turn, is joined to the recycle conduit 22 at the juncture of the conduit 22 with the first polymer solution diversion conduit 20. The conduits 24 and 28 constitute the second recycle loop of the apparatus 10. At the point of its intersection with the conduit 28, the conduit 24 is joined to an outlet conduit 30 for conveying the diluted polymer solution to a storage area, or to a site where it may be further diluted prior to use.

In the preferred embodiment of the apparatus illustrated in FIG. 1, polymer solution mixing or blending units 32, 34 and 36 advantageously are positioned in the conduits 18, 22 and 24. Exemplary of mixing units suitable for the purposes of this invention are static mixers available commercially under the designation "KOCH". Flow rates through the system can be monitored by positioning flow indicators such as flow indicators 38, 40 and 42 at strategic locations in the system. A rotameter 44 desirably is located in the diluent supply conduit 26 to measure diluent flow.

The embodiment of the apparatus shown in FIG. 2, and designated generally by reference numeral 50, comprises a triple recycle loop system, and includes an inlet 52 through which a starting polymer solution having an initial, higher concentration of polymer is introduced into the system by a conduit 54. The conduit 54 is connected to the inlet of a pump 56 which desirably is a variable speed pump of the type employed in the system shown in FIG. 1. A conduit 58 is connected to the outlet of the pump 56. The conduit 58 joins or intersects a first polymer solution diversion conduit 60. The conduit 60, in turn, is connected to a first recycle conduit 62 which is in communication with the conduit 54 upstream of the pump 56. The conduits 54, 58, 60 and 62 constitute the first recycle loop of the apparatus 50.

At the intersection or juncture of the conduits 58 and 60, the conduit 58 is joined to a conduit 64 which, in turn, is connected to a second polymer solution diversion conduit 66. The conduit 66 intersects the conduit 62 at the juncture of conduit 62 with the first polymer solution diversion conduit 60. The conduits 64 and 66 constitute the second recycle loop of the apparatus 50.

At the juncture of the conduits 64 and 66, the conduit 64 is joined to a conduit 68. The conduit 68, in turn, is connected to a third polymer solution diversion conduit 70. Upstream of the juncture of the conduits 68 and 70, a diluent supply conduit 72 is connected to the conduit 68. The conduit 70 is in communication with the inlet of a pump 74 desirably of the variable speed type. The outlet of the pump 74 is connected to a recycle conduit 76 which joins the conduit 64 at a point downstream of the juncture of the conduit 58 with the conduit 60, and upstream of the juncture of the conduit 64 with the conduit 66. The conduit 68 is connected to an outlet conduit 78 for conveying the diluted polymer solution to a storage area, or to a site where it may be further diluted prior to use. The conduits 64, 68, 70 and 76 constitute the third recycle loop of the apparatus 50.

Mixing or blending units 80, 82, 84 and 86 advantageously are located in strategic positions in the recycle loops. As in the case of the apparatus 10, the units may comprise static mixers of the type sold under the designation "KOCH". Flow of fluids through the system may be monitored by means of flow indicators 88, 90, 92 and 94. A rotameter 96 desirably is positioned in the diluent conduit 72 to measure diluent flow.

By way of illustrating the apparatus and method aspects of the invention, in utilizing the three recycle system shown in FIG. 2 to dilute a polymer solution such as an aqueous polymer solution comprising, for example, about 6%, by weight, of a partially hydrolyzed polyacrylamide to provide a solution having a polymer concentration of the order of about 1 to about 1.5%, preferably about 1.25%, by weight, an approximate 6% solution of the polymer is fed into the inlet 52 at an initial rate of about 0.50 gallons per minute (GPM). In the conduit 54, a recycled polymer solution, having a polymer concentration of about 4%, is introduced into the 6% polymer solution, upstream of the pump 56. The flow rate of the 4% solution is about 1.5 GPM. The polymer solution is then pumped by the pump 56 into conduit 58, and through the mixer 80. The fluid pressures on the entry and exit ends of the mixer 80 are approximately 100 psig and 65 psig, respectively. The concentration of the polymer solution on the exit end of the mixer 80 is about 4.5%, and the flow rate is approximately 2 GPM. At the juncture of the conduit 58 and the first polymer solution diversion conduit 60, a portion of the 4.5% solution in the conduit 58 is directed into the recycle conduit 62 where a flow rate of about 1.2 GPM is established. The remainder of the 4.5% slution from the conduit 58 passes into the conduit 64 at a flow rate of about 0.8 GPM. At a point upstream of the mixer 84, a dilute, recycled polymer solution containing about 1.25%, by weight, polymer, and flowing at a rate of about 2.67 GPM, is introduced into the 4.5% polymer solution stream in the conduit 64. The resulting solution is then passed through the mixer 84. The polymer solution exits the mixer 84 at a pressure of about 40 psig, at a flow rate of about 3.47 GPM. The polymer solution at this point contains approximately 2%, by weight, of polymer. A portion of the 2% solution is diverted into the second polymer solution diversion conduit 66. The solution passes through the conduit 66 at a flow rate of about 0.3 GPM and is combined with the 4.5% solution passing through the first polymer solution diversion conduit 60 of the first recycle loop of the system. The resulting solution is then passed through the mixer 82, and comprises the recycled solution which is combined with the 6% solution in the conduit 54 at the start of the process. The flow pressure of the solution at the exit end of the mixer 82 is approximately 25 psig.

The remainder of the 2% solution from the conduit 64 passes into the conduit 68 where a diluent, in this case water, is introduced from the supply conduit 72. The flow rate of the solution in the conduit 68 is about 3.17 GPM. The flow rate of the diluent in the conduit 72 is about 1.9 GPM. After the diluent is introduced into the polymer solution stream, it is passed through mixer 86. The stream exits from the mixer 86 at a pressure of about 25 psig. The resulting solution has a polymer concentration of about 1.25%, by weight. A portion of the final, diluted 1.25% solution is removed from the system through the outlet conduit 78. The remainder of the 1.25% from the mixer 86 is diverted into the third polymer solution diversion conduit 70, through the pump 74 and into the recycle conduit 76. The flow rate of the solution in the conduit 76 is about 2.67 GPM. The concentration of the polymer in the solution, of course, is approximately 1.25%, by weight. As indicated, the 1.25% solution is combined with the 4.5% solution in the conduit 64 upstream of the mixer 84.

The embodiment of the recycle apparatus shown in FIG. 3, and designated generally by reference numeral 98, comprises an inlet conduit 100 joined to a first dilute polymer solution conduit 102. Static mixers 104 and 106 advantageously are positioned in spaced relation along the conduit 102. At a point downstream from the outlet of the mixer 104 and upstream of the inlet of the mixer 106, the conduit 102 intersects a conduit 108 for introducing a diluent, namely, water into the polymer solution in the conduit 102. Downstream from the outlet of the mixer 106, the conduit intersects a polymer solution diversion conduit 110. The conduit 110 is connected to the inlet of a pump 112 desirably of the variable speed type. A second dilute polymer solution conduit 114 is connected to the outlet of the pump 112, and joins the conduit 102 at a point upstream of the inlet of the static mixer 104. Beyond the point of its intersection with the diversion conduit 110, the conduit 102 is in communication with an outlet 116 for the final, diluted polymer solution. Pressure gauges 118, 120 and 122 advantageously are positioned in the conduits 102, 108 and 114. A flow indicator 124 is positioned in the conduit 114 downstream of the pump 112.

In utilizing the apparatus illustrated in FIG. 3, a dilute polymer solution such as an aqueous solution of a partially hydrolyzed polyacrylamide having a polymer concentration of about 6.5 percent, by weight, is introduced by a nozzle, desirably in the form of a small diameter section of tubing, into the juncture of the conduit 102 with the conduit 114. The flow rate of the 6.5% solution at this point is about 0.3 gallon per minute (GPM). The first diluted solution thusly obtained is conveyed by the conduit 102 to the static mixer 104. The mixer 104 may be of the Koch type having a two inch diameter, and comprising both BY and CY elements. The mixed polymer solution exits the outlet of the mixer at a flow rate of about 1.65 GPM. The concentration of polymer in the solution at this stage is of the order of about 2%, by weight. At the juncture of the conduit 102 with the diluent conduit 108, the 2% polymer solution is admixed with the diluent (water) preferably through a nozzle comprising a section of small diameter tubing. The flow rate of the diluent is about 1.65 GPM. Thereafter, the solution passes into the static mixer 106 which corresponds in dimensions and construction to the mixer 104. The solution exits from the mixer 106 at a flow rate of about 3.3 GPM. The concentration of polymer in the solution is at the desired level of about 1%, by weight.

At the juncture of the conduit 102 with the diversion conduit 110, a portion of the 1% solution flows into the conduit 110, through the pump 112, and into the recycle conduit 114 which intersects the conduit 102 at a point upstream of the mixer 104 and downstream of the inlet conduit 100. The flow rate of the 1% solution in the conduit is approximately 1.35 GPM. The undiverted portion of the 1% solution exiting from the mixer 106 is conveyed to the outlet 116 from where it may be transferred to storage or to an area for further dilution prior to injection, for example, into an input well.

As is clear from the foregoing specific illustrations, the gradual dilution of the initial concentrated solution is achieved in a manner such that all streams, except possibly where water is added, have high viscosities and therefore are in laminar flow. This eliminates degradation caused by the high shear-rate of turbulent flow. When water finally enters the apparatus, it contacts polymer sufficiently dilute so that blending is easy and rapid at low flow rates in or nearly in laminar flow, so essentially no turbulence and its resulting degradation occurs. Mixing water and the highly concentrated polymer directly requires a long contact time and a high velocity. This results in turbulence in the water phase and severe degradation of the polymer molecules first entering the water phase.

While the present invention has been illustrated and described with relation to specific recycle systems, it should be understood that such showing and description have been given by way of illustration and example, and not by way of limitation.

I claim:

1. A method for progressively diluting a polymer solution at an initial, higher concentration to a final, lower concentration without degrading the polymer, including the steps of:
   (a) combining a starting polymer solution containing an initial higher concentration of polymer with a recycled polymer solution formed from a portion of said starting polymer solution, containing a lower concentration of polymer to form a first diluted polymer solution,
   (b) introducing a diluent into said first diluted polymer solution to form a second diluted polymer solution having a lower concentration of polymer than the starting polymer solution and the first diluted polymer solution,
   (c) diverting a portion of said second diluted polymer solution and utilizing it as said recycled polymer solution to form said first diluted polymer solution, and
   (d) conveying the remainder of said second diluted polymer solution downstream of the point of diversion of said second diluted polymer solution to provide the final diluted polymer solution.

2. A method according to claim 1 wherein a portion of the first diluted polymer solution is diverted before the diluent is introduced, said portion of the first diluted polymer solution being intermixed with the diverted portion of said second diluted polymer solution to form the recycled polymer solution used to form the first diluted polymer solution.

3. A method according to claim 2 wherein the diluent is introduced into the polymer solution after said portions of the first and second diluted polymer solutions have been diverted to form said recycled polymer solution.

4. A method according to claim 3 wherein after the diluent is introduced into the polymer solution, a portion of the resulting diluted polymer solution is diverted and intermixed with a portion of said first diluted polymer solution, the remainder of said resulting solution comprising the final diluted polymer solution.

5. A method according to claim 1 wherein the diluent is water, and the resulting diluted polymer solution comprises the final diluted polymer solution.

6. A method for progressively diluting a polymer solution at an initial, higher concentration to a final, lower concentration without degrading the polymer, including the steps of
   (a) combining a starting polymer solution containing an initial, higher concentration of polymer with a recycled polymer solution formed from a portion of said starting polymer solution containing a lower concentration of polymer to form a first diluted polymer solution,
   (b) diverting a portion of said first diluted polymer solution,
   (c) introducing a diluent into the remainder of said first diluted polymer solution to form a second diluted polymer solution,
   (d) diverting a portion of said second diluted polymer solution and combining it with said diverted portion of the first diluted polymer solution to form said recycled polymer solution, and
   (e) conveying the remainder of said second diluted polymer solution upstream of the point of diversion of said second diluted polymer solution to provide the final diluted polymer solution.

7. A method according to claim 6 wherein the diluent introduced into said remainder of the first diluted polymer solution is water.

8. A method according to claim 6 wherein the diluent introduced into said remainder of the first diluted polymer solution is a polymer solution having a concentration of polymer substantially equivalent to the concentration of polymer in the final, diluted polymer solution.

9. A method according to claim 6 wherein a diluent is introduced into the remainder of the second diluted polymer solution at a point downstream of the point of diversion of said second diluted polymer solution.

10. A method according to claim 9 wherein the diluent is water.

11. A method according to claim 10 wherein a portion of the diluted polymer solution is diverted to provide a third diluted polymer solution which is introduced into the undiverted portion of the first diluted polymer solution at a point downstream of the point of diversion of said portion of the first diluted polymer solution.

12. A method according to claim 11 wherein the third diluted polymer solution is used as a diluent for the undiverted portion of the first diluted polymer solution.

13. A method according to claim 10 wherein the undiverted portion of the second diluted polymer solution is withdrawn to provide the final diluted polymer solution.

14. A method according to claim 6 wherein the combined starting solution and recycled polymer solution are subjected to mixing to provide a first polymer solution having a concentration of polymer which is less than the concentration of polymer in the starting solution and greater than the concentration of polymer in the recycled solution.

15. A method according to claim 6 wherein the combined diverted portions of the first and second diluted polymer solutions are subjected to mixing to provide a recycled polymer solution containing a concentration of polymer which is less than that of the first diluted polymer solution and greater than that of the second diluted polymer solution.

16. A method according to claim 6 wherein the undiverted portion of the first diluted polymer solution and the diluent combined therewith are subjected to mixing to provide a final diluted polymer solution.

17. A method according to claim 11 wherein the combined portions of the first and third diluted polymer solutions are subjected to mixing to provide a diluted polymer solution containing a concentration of polymer which is less than that of the first diluted polymer solution and greater than that of the third diluted polymer solution.

18. A method according to claim 1 wherein the starting polymer solution comprises a partially hydrolyzed polyacrylamide.

19. A method according to claim 18 wherein the concentration of the polyacrylamide in the starting solution is approximately 6%, by weight.

20. A method according to claim 1 wherein the final dilute polymer solution has a concentration of polymer which is about 1/6 that of the starting solution.

21. Apparatus for the continuous dilution of a starting polymer solution having an initial, higher concentration of polymer to provide a final dilute polymer solution having a desired lower concentration of polymer, comprising: a plurality of intercommunicating dilute polymer solution recycle segments; inlet means for introducing a starting polymer solution into one of the recycle segments; outlet means for withdrawing a final diluted polymer solution from another of the recycle segments; a plurality of dilute polymer solution diverting means positioned between the inlet and the outlet means; dilute polymer solution recycling means in communication with the dilute polymer solution diverting means for introducing a recycled dilute polymer solution, initially formed from a portion of the starting polymer solution, into the starting polymer solution; and diluent conduit means for introducing a diluent into at least one of the recycle segments for further lowering the concentration of the polymer in the starting solution upstream of the outlet means.

22. Apparatus according to claim 21 wherein the dilute polymer solution diverting means comprises a first recycle conduit and a second recycle conduit for carrying dilute polymer solutions containing a concentration of polymer which is lower than the concentration of the polymer in the starting polymer solution, the concentration of polymer in the solution in the second recycle conduit being lower than the concentration of polymer in the solution in the first recycle conduit.

23. Apparatus according to claim 22 wherein the diverting means includes a third recycle conduit for introducing diluted polymer solution into one of the recycle segments at a point between the first and second recycle conduits comprising the dilute polymer solution diverting means.

24. Apparatus according to claim 23 wherein diluent carrying means is positioned upstream of the third recycle conduit for introducing diluent in an amount sufficient to provide a final dilute polymer solution.

25. Apparatus according to claim 22 wherein the diluent carrying means is positioned between the first and second recycle conduits for providing a lower concentration of polymer in the solution in the second recycle conduit.

26. Apparatus according to claim 21 wherein polymer solution mixing means is positioned in each of the recycle segments.

27. Apparatus according to claim 24 wherein polymer solution mixing means is positioned downstream of the diluent carrying means.

28. Apparatus according to claim 21 wherein a variable speed pump is associated with the recycle segments to control the rate of flow of polymer solution therethrough.

29. Apparatus for the continuous dilution of a starting polymer solution having an initial, higher concentration of a polymer to provide a final dilute polymer solution having a desired lower concentration of polymer, comprising: inlet means for introducing a polymer solution to be diluted into a first diluted polymer solution conduit containing a diluted polymer solution formed from a portion of said starting polymer solution to provide a first diluted polymer solution; diluent conduit means for introducing a diluent into said first diluted polymer solution conduit to form a second diluted polymer solution; a diversion conduit in communication with said first diluted polymer solution conduit for diverting a portion of said second diluted polymer solution and conveying it to a point where it is introduced into the starting polymer solution; and conduit means for conveying the undiverted portion of said second diluted polymer solution to a point of storage or use.

30. Apparatus according to claim 29 wherein separate blending means is provided for the first and second diluted polymer solutions.

31. Apparatus according to claim 30 wherein the blending means comprises static mixers, one of which is positioned upstream with relation to the diluent carrying means and the other of which is positioned downstream with relation to said means.

32. Apparatus according to claim 29 wherein nozzle means is provided for introducing the polymer solution into the first diluted polymer solution conduit.

33. Apparatus according to claim 29 wherein nozzle means is provided for introducing the first diluted polymer solution into the diluent.

* * * * *